Nov. 29, 1966    F. KLEINEKATHÖER    3,287,893
PROCESS FOR THE MANUFACTURE OF ROPES FROM PLASTIC HOSE
Filed Jan. 28, 1964

INVENTOR.
FELIX KLEINEKATHÖFER
BY
Mestern & Mestern

United States Patent Office 3,287,893
Patented Nov. 29, 1966

3,287,893
PROCESS FOR THE MANUFACTURE OF ROPES
FROM PLASTIC HOSE
Felix Kleinekathöfer, Geigelsteinstrasse 2,
Endorf, Upper Bavaria, Germany
Filed Jan. 28, 1964, Ser. No. 340,721
Claims priority, application Germany, Jan. 30, 1963,
K 48,811
5 Claims. (Cl. 57—157)

The invention relates to a process for the manufacture of ropes of all kinds from stretchable plastic hose. More particularly, it relates to the manufacture of such ropes which have the characteristics of gut strings.

The manufacture of ropes of all kinds, e.g., strings, braids, strands, cables and tows, from unstretched plastic threads is known. Thereby the threads are stretched only upon twisting and simultaneously are pulled through a nozzle or orifice which has a braking action upon the surface of the rope and which exerts tension thereon, so that the cross sections of the individual threads are compressed to polygons within a circular total cross section. The elasticity and breaking strength of ropes thus produced are influenced by, and depend upon, the selection of the length of twist and the change in the tension. Albeit such ropes have proved successful in practice, it has been found that there is room for improvement, since these ropes, among other things, do not have the character and properties of gut strings, such as their grip. They also exhibit a considerably lower ultimate tensile strength when looped or twisted as compared to normal ultimate strength or tear strength. Such strength characteristics when looped or twisted are of great importance for textiles made therefrom which are used for heavy-duty purposes.

The process according to the invention for the manufacture of ropes having gut string-like character by twisting of profiled plastic bodies with simultaneous stretching through an orifice which brakes the surface of the profiled body is characterized by starting from unstretched plastic hose which is inflated with air prior to its entry into the braking orifice or nozzle. The air bubble disposed before the orifice or nozzle which is maintained in the hose by means of rollers disposed to the rear thereof, effects regulated entry of the hose and also very fine and regular folding of the compressed hose from the outside toward the inside.

It is possible, of course, to fabricate two or more hoses simultaneously, whereby these also may consist of different materials. Furthermore, it is feasible to use hose with one or several stretchable monofilaments or to use differently colored hoses or filaments.

The invention now will be further explained with reference to the accompanying drawing, but it should be understood that this is given merely by way of illustration, not of limitation, and that numerous changes may be made in the details without departing from the spirit and the scope of the invention as hereinafter claimed.

Figure 1:
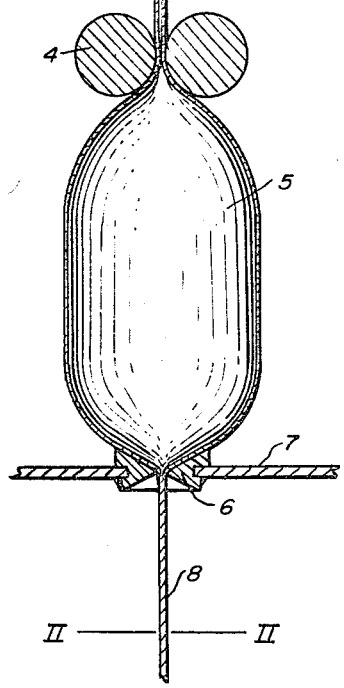
FIG. 1 is a schematic showing a device for carrying out the process according to the invention.

FIG. 1 shows a hose 1, packed flat, wound on a roll 2, which is conducted therefrom, by way of guide roll 3, through a pair of rollers 4. After leaving rollers 4, the hose is inflated with air so that it assumes the shape 5. The thus inflated hose then is conducted through restricting orifice 6 which is fastened to its holder 7, whereby restricting orifice 6 exerts on the hose simultaneously braking action and an action constricting its cross section. Thereby, simultaneous stretching and twisting of the hose occurs thus yielding the end product 8. Stretching and twisting is carried out in the conventional manner, e.g., as disclosed in my U.S. Patent No. 3,018,610, issued January 30, 1962.

Figure 2:
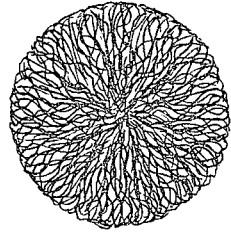
FIG. 2 is an enlarged cross section through the stretched and twisted hose, taken along lines II—II of FIG. 1.

FIG. 2 is a cross section through the finished product. It serves to illustrate that the hose wall had become thinner by passing orifice 6 and has been compressed in an almost regular fashion to a small cross section. By the pressure exerted in the orifice and simultaneous twisting, the mating surfaces of the hose are combined in such a manner that a compact and practically locked structure forms.

I claim as my invention:

1. A process for the manufacture of ropes having the characteristics of gut strings from plastic hose composed of a plurality of filaments, which comprises inflating said hose with air and passing the hose thus inflated through a zone of constriction, simultaneous braking, stretching and twisting actions being imparted to said hose while passing said zone.

2. The process as defined in claim 1, wherein a plurality of hoses is treated simultaneously.

3. The process as defined in claim 2, wherein said hoses are of different materials.

4. The process as defined in claim 1, wherein the filaments in said hose are of different materials.

5. A process for the manufacture of ropes having the characteristics of gut strings from plastic hose composed of a plurality of filaments, which comprises passing the hose, folded flat, through a pair of closely adjacent rollers and to a zone of constriction, and inflating said hose while passing from said rollers to said zone, the air remaining within the space defined by said pair of rollers and said zone of constriction; simultaneous braking, stretching and twisting action being imparted to said hose while passing said zone of constriction thereby forming a locked structure in the form of a rope.

References Cited by the Examiner
UNITED STATES PATENTS

| | | | |
|---|---|---|---|
| 2,346,187 | 4/1944 | Reichel | 264—95 |
| 2,476,140 | 7/1949 | Francis | 264—95 |
| 2,488,571 | 11/1949 | Trull | 264—95 X |
| 2,541,064 | 2/1951 | Irons | 264—95 X |
| 2,578,899 | 12/1951 | Pace | 264—95 X |
| 3,013,003 | 12/1961 | Maragliano et al. | 264—95 |
| 3,166,616 | 1/1965 | Bild et al. | 264—95 |
| 3,170,012 | 2/1965 | Stinchcombe | 264—95 |
| 3,201,503 | 8/1965 | Benning et al. | 264—95 |

FRANK J. COHEN, Primary Examiner.

MERVIN STEIN, Examiner.

J. PETRAKES, Assistant Examiner.